(12) United States Patent
Mima et al.

(10) Patent No.: US 7,027,069 B2
(45) Date of Patent: Apr. 11, 2006

(54) PROGRAM FOR AUTOMATIC PICTURE FORMATION AND STORAGE MEDIUM STORING THE PROGRAM

(75) Inventors: Yoshiaki Mima, Hokkaido (JP); Kenichi Kimura, Hokkaido (JP)

(73) Assignee: SEC Corporation, Hokkaido (JP)

( * ) Notice: Subject to any disclaimer, the term of this patent is extended or adjusted under 35 U.S.C. 154(b) by 0 days.

(21) Appl. No.: 10/480,067

(22) PCT Filed: Jun. 7, 2002

(86) PCT No.: PCT/JP02/05651

§ 371 (c)(1),
(2), (4) Date: Jun. 17, 2004

(87) PCT Pub. No.: WO02/101654

PCT Pub. Date: Dec. 19, 2002

(65) Prior Publication Data

US 2004/0217969 A1     Nov. 4, 2004

(30) Foreign Application Priority Data

Jun. 7, 2001   (JP) .............................. 2001-173060

(51) Int. Cl.
*G09G 5/02*   (2006.01)

(52) U.S. Cl. ...................................... 345/594; 345/593

(58) Field of Classification Search ................ 345/593, 345/594, 595, 619, 629, 600, 601, 602
See application file for complete search history.

(56) References Cited

U.S. PATENT DOCUMENTS

| 5,469,536 | A | * | 11/1995 | Blank | .......................... 345/594 |
| 6,619,860 | B1 | * | 9/2003 | Simon | .......................... 382/277 |
| 2005/0001854 | A1 | * | 1/2005 | Schuster et al. | ............ 345/639 |

FOREIGN PATENT DOCUMENTS

JP           10-055450           2/1998

* cited by examiner

*Primary Examiner*—Matthew Luu
(74) *Attorney, Agent, or Firm*—Withrow & Terranova, PLLC

(57) ABSTRACT

A making person stores the objects (5) in the element stock (4), makes the pallet (6), takes out the objects (5) from the element stock (4) in accordance with the rule of the making person at first and arranges it, thereafter paints it in reference to the pallet (6) and subsequently a changing in selection of the objects (5) from the element stock (4) and a changing in arrangement or color painting are carried out automatically in reference to some parameters made on the basis of some random numbers generated at the time of arrangement or color painting of the objects (5), thereby a different pattern (P) is automatically made while the same taste being kept. Accordingly, even the making person having a less amount of skill or experience for making a picture can easily produce a pattern showing an individual character of the making person.

17 Claims, 8 Drawing Sheets

(a)

(b)

(a)

(b)

(a)

(b)

PROGRAM FOR AUTOMATIC PICTURE FORMATION AND STORAGE MEDIUM STORING THE PROGRAM

This application is a National Phase filing based on International Application No. PCT/JP02/05651, filed Jun. 7, 2002, published on Apr. 22, 2004 under number WO 2002/101654, which claims priority to Japanese application 2001-173060, filed Jun. 7, 2001, currently pending.

FIELD OF THE INVENTION

This invention relates to an automatic picture generating program where a computer automatically generates a picture such as an abstract picture, for example, even under a state in which a human being is not placed in the system, and more particularly to a recording medium capable of being read by a computer having the automatic picture generating program recorded therein.

More particularly, this invention relates to a mechanism for determining a composition and instructing its procedure under application of the automatic picture generating program.

BACKGROUND OF THE INVENTION

In the related art, there has been present a computer program called as "AARON" developed by Mr. Harold Cohen as a preceding prior art example of an image generating technology in a computer.

Although Mr. Harold Cohen is an artist acknowledged in the field of art as an abstract artist representing in England at the later half period in 1960's, he is well working mainly in the field of art and study for making an artistic art through the computer rather than by drawing a picture by himself.

In turn, as a picture making skill, a composition making capability for effectively arranging the composing elements of a picture and assembling an entire composition or a color tone taste is generally difficult in view of easily attaining this skill.

However, in the case of such a prior art "AARON" as described above, there occurs a problem in which it is quite hard for a making person having a less amount of skill or experience making a picture to generate a pattern (superior in an individual characteristic not corresponding to the existing pattern) of a creative characteristic because a user makes either a composition or the color painting variable.

SUMMARY OF THE INVENTION

In order to accomplish the aforesaid objects, the invention has a feature to cause a computer to realize an object memory function for storing some prepared basic forms or hand-drawn objects in an element stock; a color tone storing function for making a palette and memorizing it in reference to a color tone information extrated from existng images; a composition function for arranging the objects taken out of said element stock at a proper position in a screen; a color painting function for taking out color from said pallette and painting it on the screen having the objects arranged therein; a parameter memory function for taking out the objects from said element stock in accordance with a rule predetermined by a picture making person and arranging them, painting them in color from the pallette, making some parameters in reference to some random numbers generated at the time of arranging or color painting of these objects; and a pattern changing function for changing a selection of the objects from said element stock and their arrangement or color painting on the basis of the parameters read in reference to the parameter memory function.

In this case, the rule is determined in advance by a making person (user).

The invention generated through such a constitution as above is carried out such that a making person stores an object in an element stock, when a palette is made, the making person at first takes out the object from the element stock in accordance with the rule, arranges it, thereafter the object is painted in color from the palette, and subsequently a changing in selection of the objects from the element stock and a changing in their arrangement or color are carried out automatically through some parameters made in reference to some random numbers generated at the time of arrangement or color painting of these objects, thereby the different patterns while holding a same taste are made automatically.

The invention has a feature that a constitution where said parameter memory function and said pattern changing function are repeatedly realized.

The invention generated by the constitution added in this way is operated such that a changing of some patterns is repeated on the basis of some parameters newly generated every time the object is selected and their arrangement or color painting is repeated.

The invention has a feature that a constitution where an operator stops a repetitive operation of said parameter memory function and said pattern-changing function.

The invention generated under the added constitution is repeated until the operator stops the selection of the object, arrangement or color painting.

The invention has a feature that a constitution where a size changing of the object taken out of the element stock is included in said pattern changing function.

The invention generated through such an added constitution as above may generate a pattern drawing the objects having different sizes.

The invention has a feature that the constitution in which a rule for determining whether or not the object taken out of the element stock is placed on a certain specified object is included in said pattern changing function.

The invention generated through such an added constitution as above enables a pattern having a specified object intensified to be generated.

The invention has a feature in which said pattern changing function includes a rule for determining a color painting in reference to a color painting information around the arranged object.

The invention generated by such a constitution as above enables a pattern of color painting in accordance with a desire of the operator around the object.

BRIEF DESCRIPTION OF THE DRAWING FIGURES

FIG. 1 is a schematic view (a block diagram) for showing a screen generated by an automatic picture generating program to show one preferred embodiment of the present invention.

FIGS. 2(a) and (b) are schematic views for showing a screen to show an example of generating an object.

FIGS. 3(a) and (b) are schematic views for showing a screen to show an example of generating an object.

FIG. 4 is a schematic view for showing a screen to show an example of generating an object through a tracing operation.

FIGS. 5(*a*) and 5(*b*) are schematic views for showing a screen when a displaying or a non-displaying of an object is selected.

Figure 10:
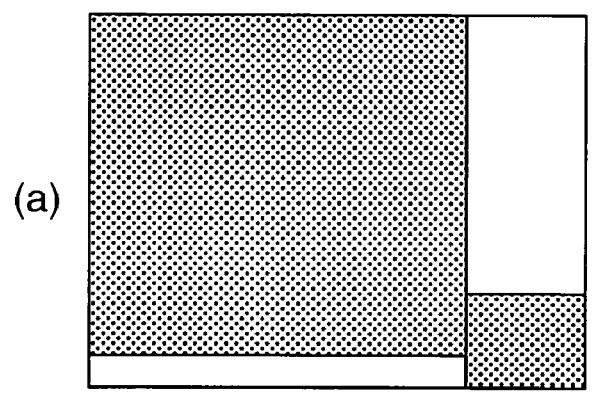
Figure 10:
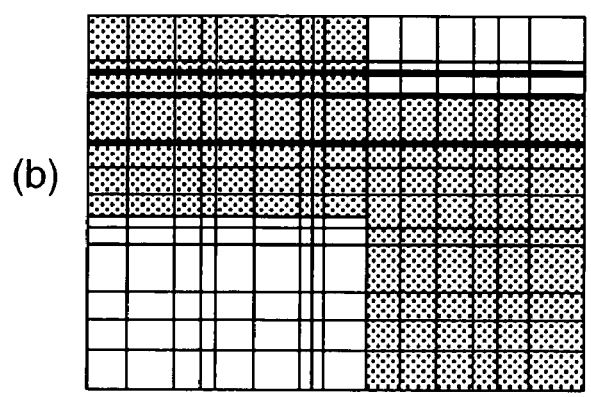

FIG. 10(*a*) and FIG. 10(*b*) are schematic views for illustrating a practical example of rule utilizing some random numbers.

Figure 11:
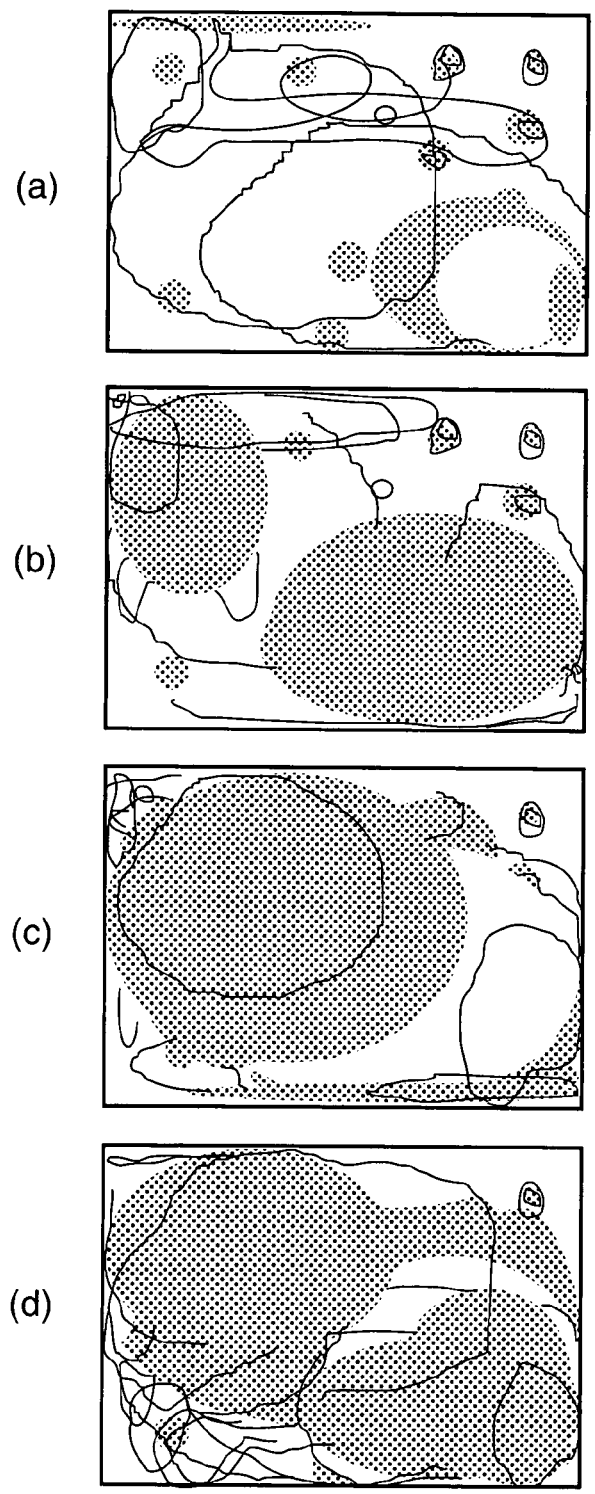

FIGS. 11(*a*) to (*d*) are schematic views for showing a screen to illustrate examples of work generated by an automatic picture-generating program of the present invention.

DETAILED DESCRIPTION OF THE PREFERRED EMBODIMENTS

Figure 1:
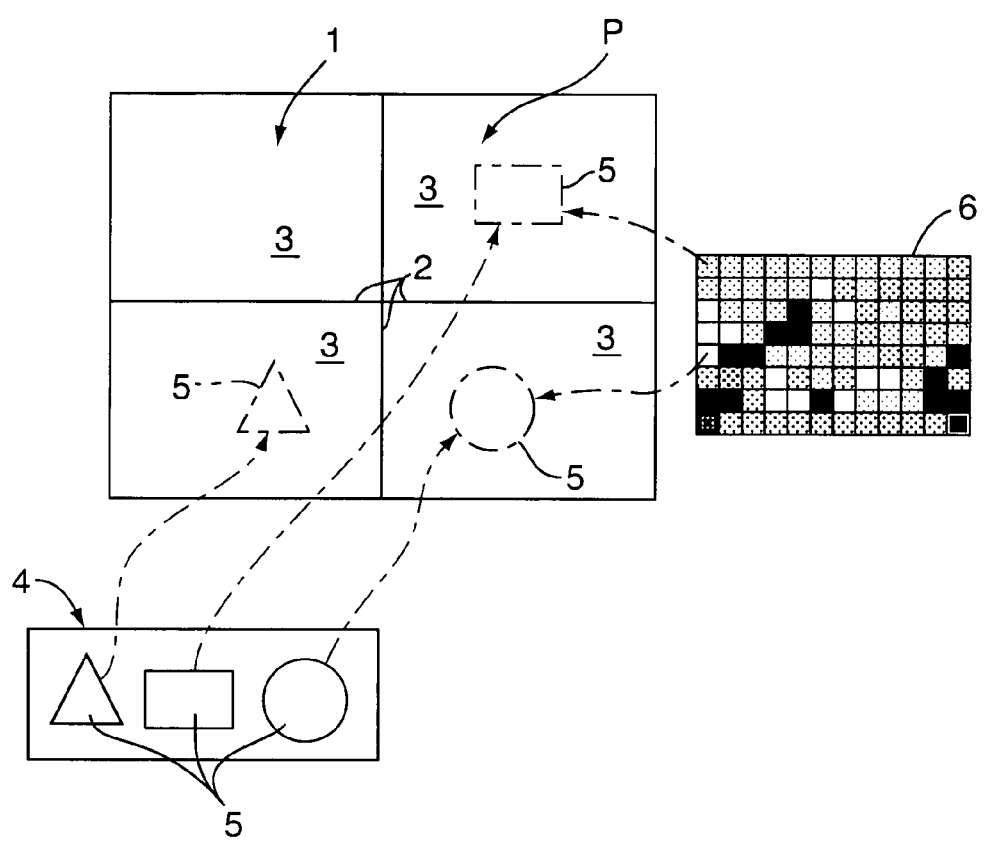

As shown in FIG. 1, the preferred embodiment of the present invention indicates a case that a canvas 1 corresponding to a location where a picture is drawn is opened in a screen size of a computer, for example, this size is one determined as a region of the screen in the case of Windows (a registered trademark) of Microsoft, frame lines 2 like Mondrian (a painter from Nederland) are drawn and divided into a plurality of regions 3 . . . , objects 5 . . . taken out of a component stock 4 are arranged in sequence in these frame lines 2 and at the same time, a color is taken out of a pallet 6 to paint color, thereby an abstract picture is generated as a pattern P, thereafter only the pattern P is removed from the canvas (a screen) 1 to draw a picture again.

A procedure for generating the aforesaid pattern P can be divided into the following steps.

A. Generating of an object:

An object is defined as an element appeared in a picture and a basic form (class) prepared in advance such as a circle or an ellipse or a rectangular shape or a polygonal shape and the like can be realized or a folding line figure having non-specified control points, other figures such as an arrow figure or the like, for example, can also be realized and further this can be defined as a hand-made object. As the hand-made object, it is assumed there is applied one in which the existing image read through a scanner and the like is traced.

The object is a minimum unit constituting the canvas and it is possible to instruct a producing or erasing, moving or changing in characteristic for every object.

Figure 2:
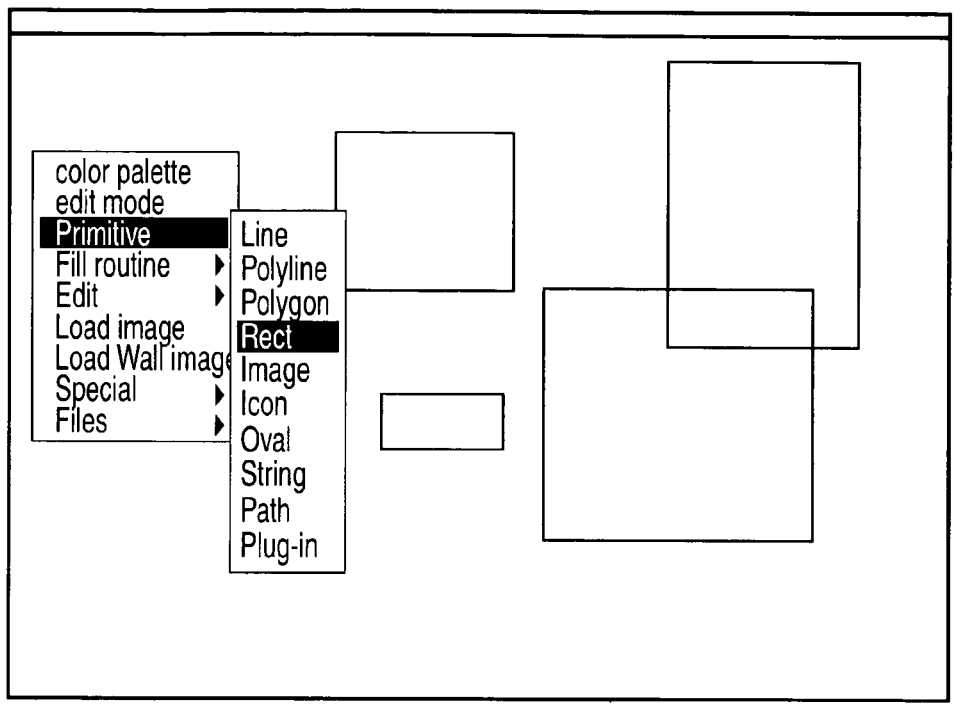
Figure 2:
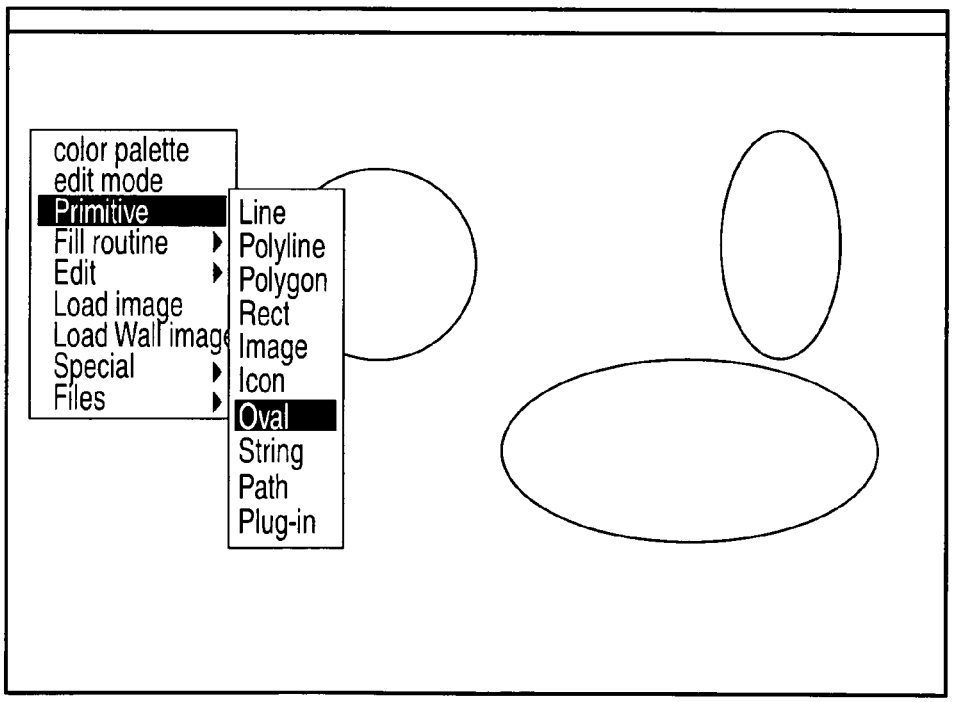

Describing the practical example shows that as shown in FIGS. 2(*a*) and 2(*b*), the aforesaid basic form is constructed such that a desired shape is drawn by selecting an item from a pop-up menu through a direct operation under utilization of a pointing device (mainly, a mouse).

Figure 3:
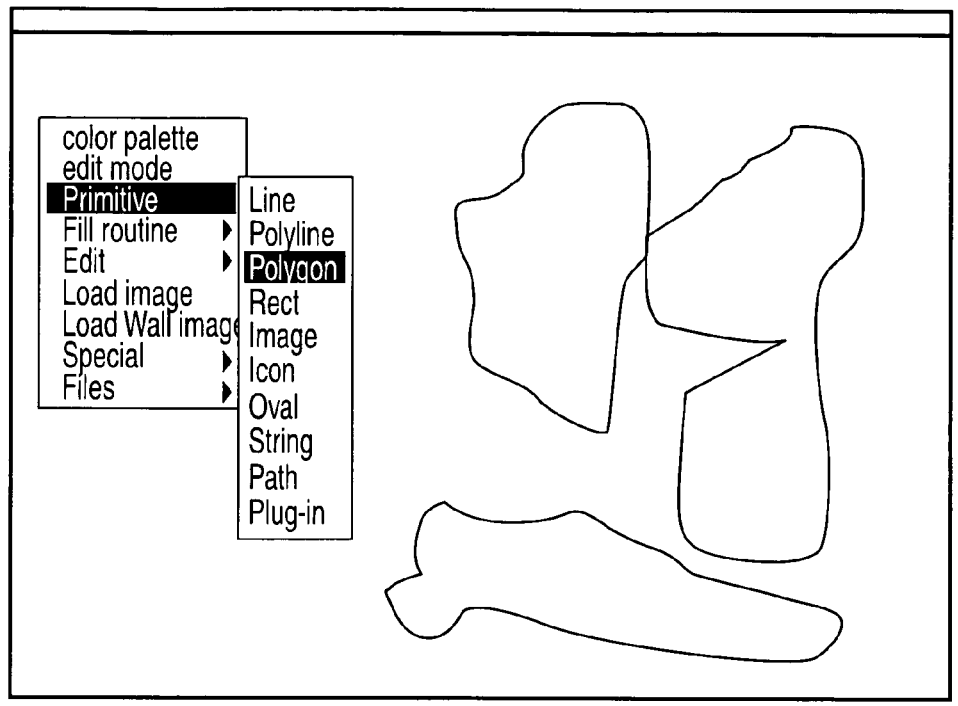
Figure 3:
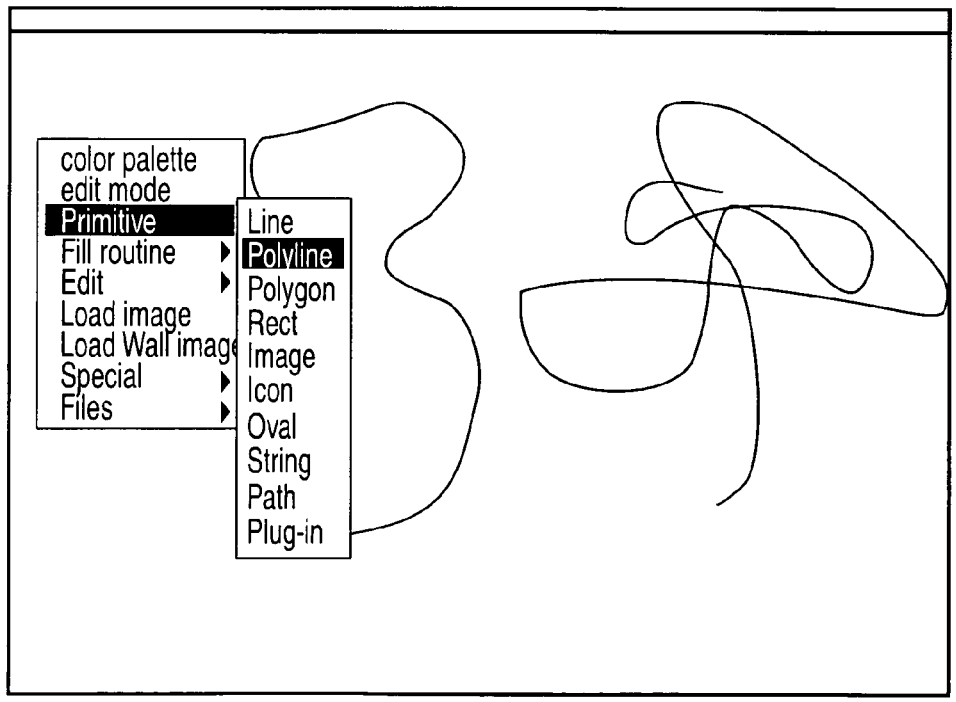

In addition, as shown in FIGS. 3(*a*) and 3(*b*), it is also possible to draw a closed curved line or an opened curved line or a straight linear line.

Figure 4:

As shown in FIG. 4, profiling the shape of a lemon on the screen and cutting it out with a still-picture of Paul Cèzanne, for example, being applied as a base picture, can draw a trace of the existing image.

Figure 5:
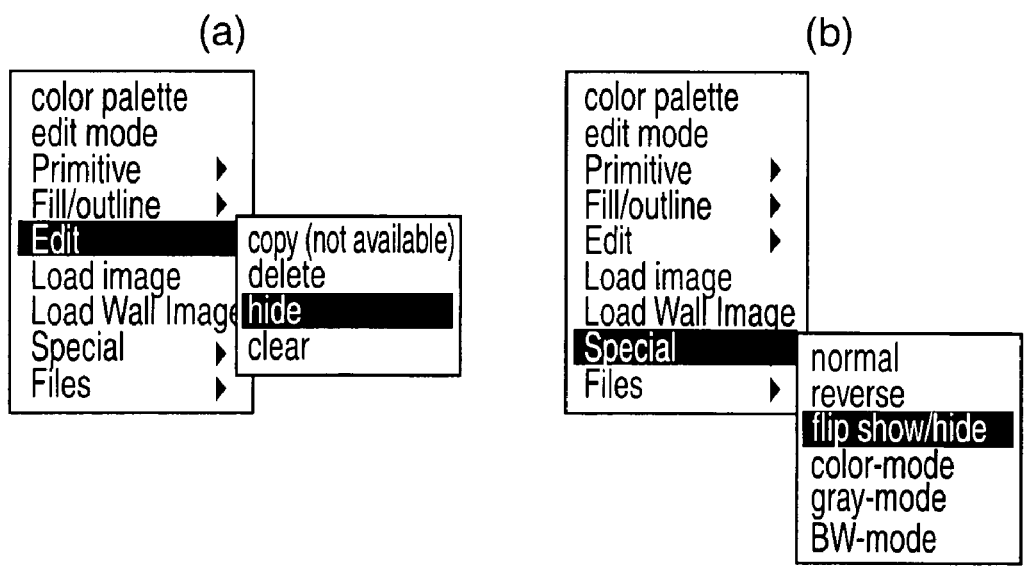

Further, these objects may have two states of display and non-display, and more practically, when an object is selected and a hide is specified as shown in FIG. 5(*a*), the non-displayed state appears and in turn when a flip show hide is specified as shown in FIG. 5(*b*), it is possible to change-over the non-displayed object and the displayed object and when it is desired to display again the non-displayed object, the flip show hide operation is performed again.

B. Registration of Object:

The aforesaid object is registered in an object buffer acting as the component stock 4 which is an element for generating a picture.

A plurality of objects 5 . . . are monitored as data of wooden structure and the like. As a method for realizing the object buffer, there is provided a flag indicating whether or not the object buffer is present on the component stock 4 for every object. As a data not displaying the object, it is possible to apply a method for monitoring it on another wooden structure.

Figure 6:
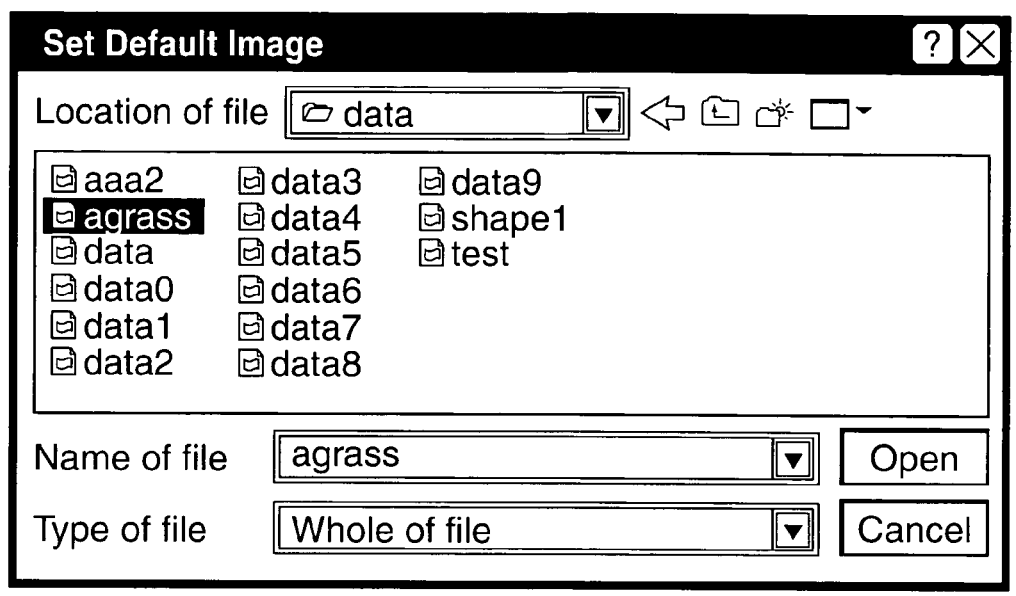
FIG. 6 is a schematic view for showing a screen when an object is registered.

Describing the practical example shows that a file dialogue-loader as shown in FIG. 6 is displayed by selecting either an associated Export or Import on a pop-up menu and it becomes possible to write a figure data of the objects 5 . . . into the file or to read the figure data from the file into the objects 5 . . .

C. Selection of Color Tone

Although it is also possible to select a desired color from some prepared primary colors and set it in order to perform a color painting, the present preferred embodiment is carried out such that a pallet 6 is constituted in advance by a method for taking out color tone information from the existing image and generating some random numbers.

This pallet 6 can be generated by various kinds of method such as a random generation, both the random generation and application of a rule to be described, an extraction of existing works and photographs, both an extraction of existing works and photographs and a rule to be described.

Figure 7:
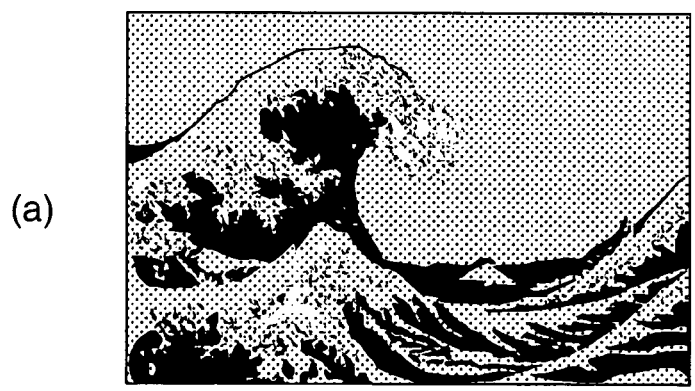
FIG. 7(*a*) is a schematic view for showing an existing image and FIG. 7(*b*) is a schematic view for showing a pallet made by the existing image.
Figure 7:
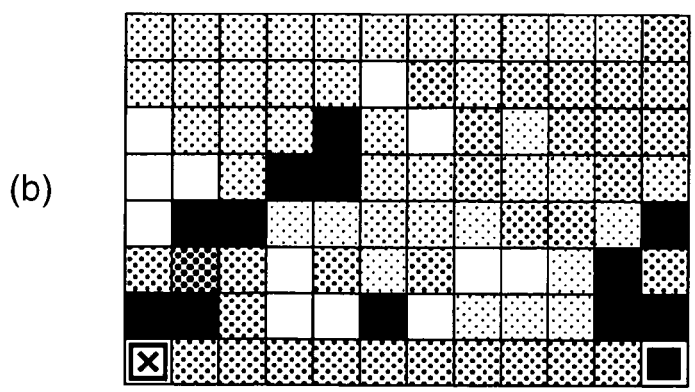

Describing the practical example shows that the pallet 6 shown in FIG. 7(*b*) is made on the basis of a woodcut print of Hokusai Katsushika shown in FIG. 7(*a*), and in this case, the pallet 6 is attained such that the already read-in image is reduced in size of 12 dots by 7 dots under application of an existing image reduction algorism, and colors in the generated figure are assigned in a unit of pixel.

D. Arrangement of the Object and its Color Painting

The objects 5 . . . are taken out of the component stock 4 in accordance with a rule to be described later, and arranged in a plurality of regions 3 . . . partitioned by the frame lines 2 in accordance with this rule.

This rule defined as above is meant by a determination whether or not what type of objects 5 . . . is taken out of the component stock 4, a determination about a range of arranging position when it is set in reference to the random numbers, a determination about a probability of location where the objects are arranged or a procedure for determining whether or not the arranging position is set on a certain specified object and the like, its contents can be determined in advance by a draft making person (a user).

Further, a color tone is determined after its arrangement is set, and information about the color is attained by the aforesaid pallet 6 or information of the colors of the surrounding objects 5 . . . when the arrangement is set.

Describing the practical example of the present invention shows in what manner a color mapping is carried out in reference to the pallet 6 under specifying separately the aforesaid rule.

As to the mapping method, there may be applied the most self-evident method in which a color is scanned from the left upper position in the pallet 6 to a rightward direction and a color scanning is started from the lower row upon completion of one lateral row, a method for determining it with some random numbers or a method for applying a certain restriction on mapping in response to upper or lower absolute position, right or left absolute position on the campus 1 on the objects 5 . . . to be colored or other methods.

E. Repetition of Generation of Drawing Picture

In the case of the aforesaid arranging operation, selection of the objects 5 . . . or their position setting and color painting are repeated in accordance with the aforesaid rule and a stopping condition of this repeating operation is also described in the rule.

That is, after the positions of the objects 5 . . . are determined and their arrangement is set, it is discriminated whether or not the objects 5 . . . are arranged continuously. This discrimination is carried out manually by a person as one of the operations or carried out automatically under application of the rule.

As an example of discrimination in stopping of operation, there may be provided a simple example that consists in the case that a surplus area reaches a specified amount or the number of drawn objects reaches a specified amount.

Figure 8:
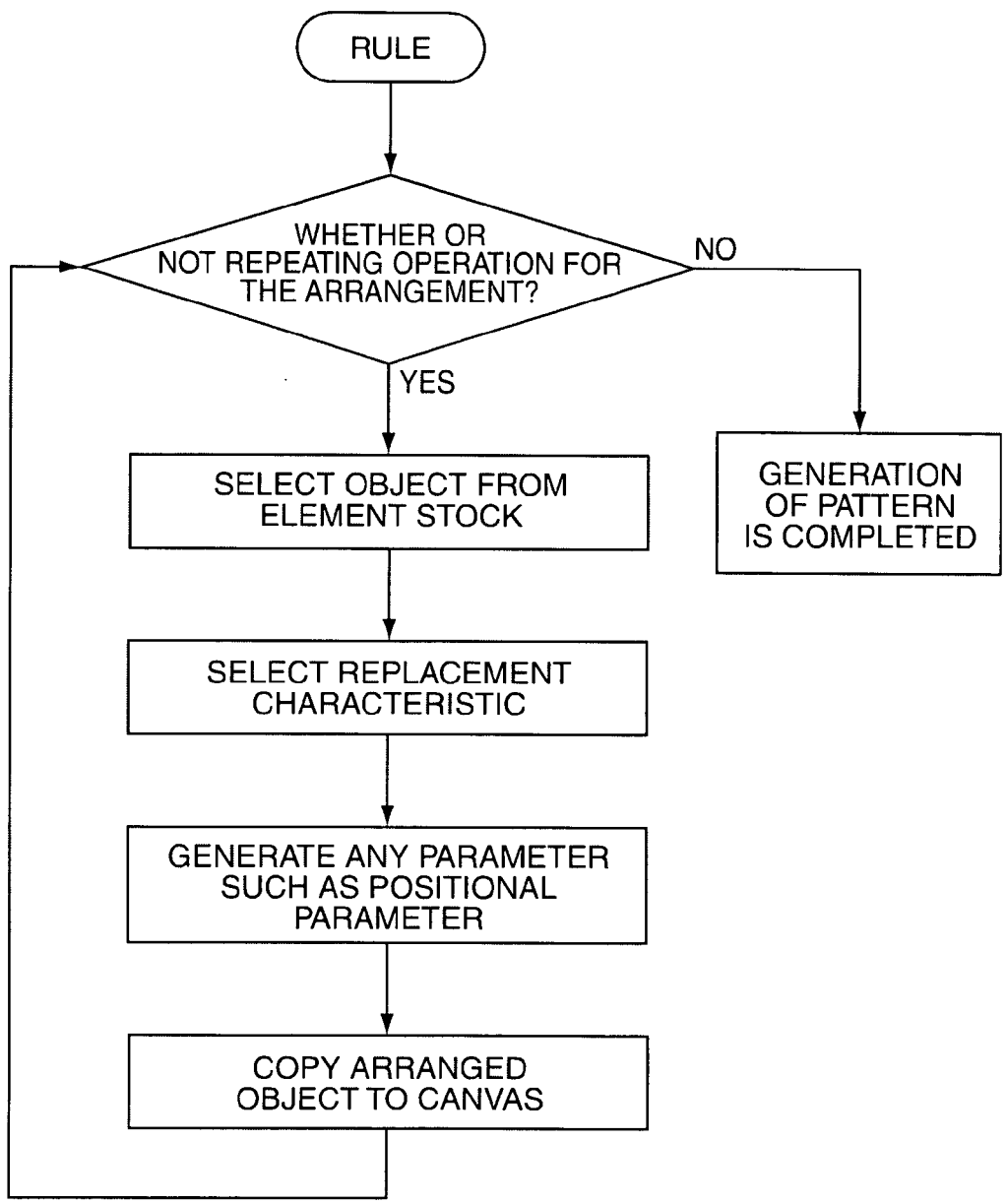
FIG. 8 is a flow-chart of a rule.

Describing a more practical example shows that when the repeating operation for the arrangement is continued at first as shown in the flow-chart in FIG. 8, the objects 5 . . . are selected from the element stock 4 and then a changing-over in arrangement of the objects 5 . . . or replacement characteristic such as a color change or the like is selected.

Subsequent to this operation, some parameters are made in response to same random numbers produced when the arrangement of the objects 5 . . . or color charge of the objects 5 . . . and then the objects 5 . . . arranged in response to the parameters are copied in the canvas 1.

After this operation, the program returns to a step to check whether or not the repetition of arrangement is continued, wherein if an operator repeats the arrangement operation, the generation of the patterns P . . . is completed.

Then, a practical example about specifying of some parameters determining a form of the aforesaid objects 5 . . . , determination of their positions and the rule utilizing some random numbers will be described in a supplemental manner.

"Specifying Some Parameters Determining the Form"

If the object is a circle, its parameters such as its center and its radius are present and if the object is a rectangular shape, its parameters such as two points constituting its orthogonal line are present, the parameters being present for determining the form of the object.

Figure 9:
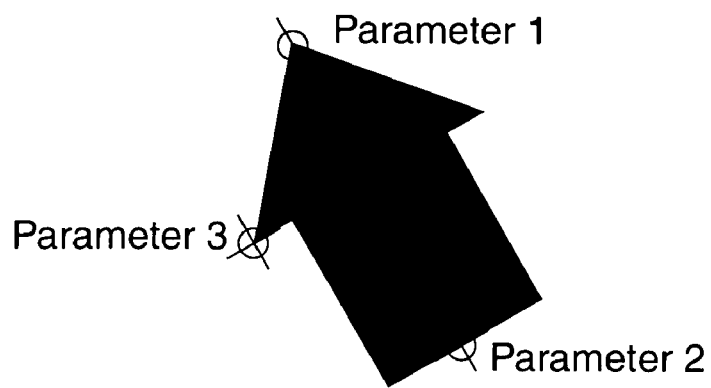
FIG. 9 is a schematic view for illustrating some parameters determining a form.

If the object is of an arrow mark shown in FIG. 9, for example, the number of parameters specified by the type of the object or the restriction between the parameters is made different in such a way that two parameters such as a length of the arrow mark and a size of the arrow point may be present.

It is possible to determine an overall feature of the object by generating these parameters.

"Determining of Position"

Although a determination of arrangement of the object is dependent on the arrangement rules selected and specified by a user, there may be present some various kinds of rules such as a rule merely based on the random numbers, a rule dependent on its relation with the existing object or a rule accompanied by a changing in size. As to the position-determining rule utilizing some random numbers, this rule will be described later.

"Practical Example of a Rule Utilizing some Random Numbers"

A method for displaying a picture similar to the work of Pieter Cornelis Mondrian, an artist from Netherlands, with some random numbers will be described above.

A screen shown in FIG. 10(a) is expressed by a similar shape constituted such that its upper and lower, or right and left spaces are partitioned by solid frame lines under a suitable rate, and a method for stably generating such a figure as above will be described as follows.

In the case of the figure shown in FIG. 10(b), a fine line other than the pattern P finally generated is drawn, although this line corresponds to an auxiliary line. In the case of this method, the auxiliary line is generated at first, and then some parameters of the object 5 used in drawing of a picture are generated from the auxiliary line by a concrete means shown as follows.

1. The numbers n, m not including the right and left sides of the auxiliary line in a vertical direction and a lateral direction, a size w (a lateral width) of a rectangular shape and h (a height) are determined.

2. Each of numbers (n+1) and (m+1) of the random numbers is generated.

3. When these random numbers are w1, w2 . . . wn, h1, h2 . . . hm, x-coordinate in a vertical direction and y-coordinate in a lateral direction of the auxiliary line are $$xi=wi/(w1+w2+ \ldots +wn) \times w$$

$$yj=hj/(h1+h2+ \ldots +hm) \times h$$

(Applying of such a method as above causes a value generated as a random number to be used as a coordinate value and a less opportunity of too near value occurs.)

4. After this calculation, there is executed a step in which one vertical line and two lateral lines are selected from these numbers n of the vertical lines and these numbers m, 1) a vertical partition is made by the vertical solid line and then 2) a lateral space is further divided by two lateral lines and colored.

In turn, the patterns P . . . having the same taste have been generated as indicated from FIG. 1(a) to FIG. 1(d) by a method wherein the computer is caused to realize a function for adding a changing in size of the objects 5 . . . and determining a frame work while performing an automatic arrangement and an automatic color painting of the objects 5 . . . under application of the automatic picture generating program of the present invention described above.

Applying this function enabled an automatic production of different works while being in a similar scene on the basis of the objects 5 . . . drawn or selected by a drawing person.

In the case of the aforesaid preferred embodiment, it has been indicated the case that Pieter Cornelis Mondrian type frame lines 2 are drawn on the canvas 1, partitioned into a plurality of regions 3 . . . , the objects 5 . . . taken out of the element stock 4 are arranged in sequence in these frame lines 2, colors are taken out of the pallet 6 to paint the objects, thereby an abstract picture is generated as the pattern P. However, the present invention is not restricted to the preferred embodiment and it may also be applicable that another pattern other than the abstract picture is generated under application of a similar function.

INDUSTRIAL APPLICABILITY

As described above, the present invention is carried out such that when a drawing person stores objects in an element stock and makes a palette, at first the drawing person takes out the objects from the element stock in accordance with the drawing person's rule and arranges them, thereafter paints them in reference to the palette and subsequently, a changing in selection of the objects out of the element stock and a changing in selection of arrangement of the objects or their color paintings are carried out automatically in reference to some parameters made in accordance with some random numbers generated at the time of arrangement or color painting of these objects, thereby different patterns while keeping the same taste are made automatically, so that even a drawing person having a less amount of skill or experience in drawing a picture can easily produce a pattern showing a specific characteristic of the drawing person.

Accordingly, it is possible to provide a user-interface for use in arranging an object to be drawn in a software for automatically generating a picture.

In addition to the effect of the invention can generate a limitless number of a series of patterns because a changing in patterns is repeated on the basis of sonic parameters newly generated every time a selection of the objects and their arrangement or their color painting are repeatedly changed.

In addition to the effect of the invention can generate a new style pattern while a drawing person is looking at some patterns generated in sequence because selection of the objects and their arrangement or their color painting are repeated until the operator stops these operations.

In addition to the effect of the invention can increase the kind of patterns capable of being generated because the patterns having different sized objects drawn can be generated.

In addition to the effect of the invention can easily generate a pattern showing a high common characteristic because a pattern intensifying some specific objects can be generated.

In addition to the effect of the invention can easily generate a pattern showing an individual style color because a pattern of painted color responding to a request of a drawing person mainly in regard to the object.

The invention claimed is:

1. A computer readable medium comprising software with instructions adapted to instruct a computer to:
   store one or more objects in an element stock;
   make a palette of colors from an existing image;
   arrange the one or more objects taken from the element stock at least a decked position on a canvas displayed on a screen such that the one or more objects form a first object on the canvas;
   take color from the palette of colors and painting the canvas with the color;
   take the one or more objects from the element stock and arrange the one or more objects on the canvas according to a rule such that the one or more objects form a second object on the canvas, paint the second object with colors from the palette of colors, generate one or more parameters with reference to at least one random number generated when the second object is arranged or painted; and
   change a selection of the one or more objects and generate a new arrangement or a color scheme with reference to the one or more parameters.

2. The computer readable medium of claim 1, wherein the software is further adapted to instruct the computer to repeatedly:
   take the one or more objects from the element stock and range the one or more objects on the canvas according to the rule such that the on&or more objects form the second object on the canvas, paint the second object with the colors from the palette of colors, generate one or more parameters with reference to the at least one random number generated when the second object is arranged or painted; and
   change the selection of the one or more objects and generate the new arrangement or the color scheme wit reference to the one or more parameters.

3. The computer readable medium of claim 1 wherein the software is further adapted to terminate upon instruction from a user.

4. The computer readable medium of claim 1 wherein the software is further adapted to change size of the one or more objects.

5. The computer readable medium of claim 1 wherein the software is further adapted to generate a second rule relating to whether the one or more objects in the element stock may be placed on another object.

6. The computer readable medium of claim 1 wherein the software is further adapted to generate a third rule that determines whether an object is painted a particular color from the palette.

7. A method of generating images on a computer display comprising:
   storing one or more objects in an element stock;
   making a palette of colors from an existing image;
   arranging the one or more objects taken from the element stock at least a desired position on a canvas displayed on a screen such that the one or more objects form a first object on the canvas;
   taking color from the palette of colors and painting the canvas with the color;
   taking the one or more objects from the element stock and arranging the one or more objects on the canvas according to a rule such that the one or more objects form a second object on the canvas, painting the second object with colors from the palette of colors, generating one or more parameters with reference to at least one random number generated when the second object is arranged or painted; and
   changing a selection of the one or more objects and generate a new arrangement or color scheme with reference to the one or more parameters.

8. The method of claim 7 wherein
   taking the one or more objects from the element stock and arranging the one or more objects on the canvas according to the rule such that the one or more objects form the second object on the canvas, painting the second object with colors from the palette of colors, generating one or more parameters with reference to the at least one random number generated when the second object is arranged or painted; and
   changing the selection of the one or more objects and generate the new arrangement or the color scheme with reference to the one or more parameters are performed repeatedly.

9. The method of claim 7 further composing terminating upon instruction from a user.

10. The method of claim 7 further comprising changing size of the one or more objects.

11. The method of claim 7 further comprising generating a second rule relating to whether the one or more objects in the element stock may be placed on another object.

12. The method of claim 7 further comprising generating a third rule that determines whether an object is painted a particular color from the palette.

13. A computer adapted to:
store one or more objects in an element stock;
make a palette of colors from an existing image;
arrange the one or more objects taken from the element stock at least a desired position on a canvas displayed on a screen such that the one or more objects form a first object on the canvas;
take color from the palette of colors and painting the canvas with the color;
take the one or more objects from the element stock and arrange the one or more objects on the canvas according to a rule such that the one or more objects form a second object on the canvas, paint the second object with colors from the palette of colors, generate one or more parameters with reference to at least one random number generated when the second object is arranged or painted; and
change a selection of the one or more objects and generate a new arrangement or color scheme with reference to the one or more parameters.

14. The computer of claim 13, wherein the computer is further adapted to repeatedly:
take the one or more objects from the element stock and arrange the one or more objects on the canvas according to the rule such that the one or more objects form the second object on the canvas, paint the second object with colors from the palette of colors, generate one or more parameters with reference to the at least one random number generated when the second object is arranged or painted; and
change the selection of the one or more objects and generate the new arrangement or color scheme with reference to the one or more parameters.

15. The computer of claim 13 wherein the computer is further adapted to change size of the one or more objects.

16. The computer of claim 13 wherein the computer is further adapted to generate a second rule relating to whether the one or more objects in the element stock may be placed on another object.

17. The computer of claim 13 wherein the computer is further adapted to generate a third rule that determines whether an object is painted a particular color from the palette.

* * * * *